United States Patent [19]

Watanabe

[11] 4,423,439

[45] Dec. 27, 1983

[54] FACSIMILE TRANSMITTER

[75] Inventor: Asao Watanabe, Higashikurume, Japan

[73] Assignee: Canon Kabushiki Kaisha, Tokyo, Japan

[21] Appl. No.: 350,060

[22] Filed: Feb. 18, 1982

[30] Foreign Application Priority Data

Mar. 3, 1981 [JP] Japan .................................. 56-29394
Mar. 3, 1981 [JP] Japan .................................. 56-29395

[51] Int. Cl.$^3$ ........................ H04N 1/24; H04N 1/12
[52] U.S. Cl. ........................................ 358/287; 355/7; 358/77
[58] Field of Search ........................ 358/287, 77, 225; 355/7

[56] References Cited

U.S. PATENT DOCUMENTS 4,366,508 12/1982 Crean .................................. 358/287

FOREIGN PATENT DOCUMENTS 53-120323 10/1978 Japan .................................. 358/287
55-165068 12/1980 Japan .................................. 358/287

Primary Examiner—Howard Britton
Attorney, Agent, or Firm—Fitzpatrick, Cella, Harper & Scinto

[57] ABSTRACT

This invention provides a facsimile transmitter capable, in transmitting the image signals with an image size modified in the principal scanning direction of the original image, of modulating the displacement of the original image in the auxiliary scanning direction in response to the rate of said modification of image size, for example image enlargement.

The apparatus is further capable of regulating the displacement in the auxiliary scanning direction inversely proportional to the rate of said modification of image size in the principal scanning direction, further of indicating that said modification is for example an image enlargement, and of showing an intermittently lighted indication for example for an image enlargement during such signal transmission with modified image size in order to facilitate the confirmation of the transmission mode.

21 Claims, 34 Drawing Figures

(a) (b)

(a) (b)

FACSIMILE TRANSMITTER

BACKGROUND OF THE INVENTION

1. Field of the Invention

The present invention relates to a facsimile transmitter capable of transmitting image signals of an optical original image by scanning in a principal scanning direction, combined with scanning in an auxiliary scanning direction.

2. Description of the Prior Art

A conventional facsimile transmitter transmits image signals from an original image for image reproduction with a size equal to that of the original image. There has also been proposed a facsimile transmitter capable of transmitting the signals with a size reduction corresponding to the recording capacity of the facsimile receiver in case it is unable to reproduce the transmitted image in equal size. It has however been difficult to transmit the information of a detailed original image without error, since the pixel density of the facsimile is not necessarily sufficient for faithful transmission of such a detailed original image.

SUMMARY OF THE INVENTION

A first object of the present invention is to provide a facsimile transmitter capable of exactly transmitting the detailed original image with a sufficient resolving power.

A second object of the present invention is to provide a facsimile transmitter capable of transmitting the image signals matching the size of the recording sheet.

A third object of the present invention is to provide a facsimile transmitter capable of indicating for example the image enlargement mode in such signal transmission with a modified image size.

DESCRIPTION OF THE PREFERRED EMBODIMENTS

Now the present invention will be clarified in detail by the following description of a preferred embodiment, to be taken in conjunction with the attached drawings.

Figure 1:
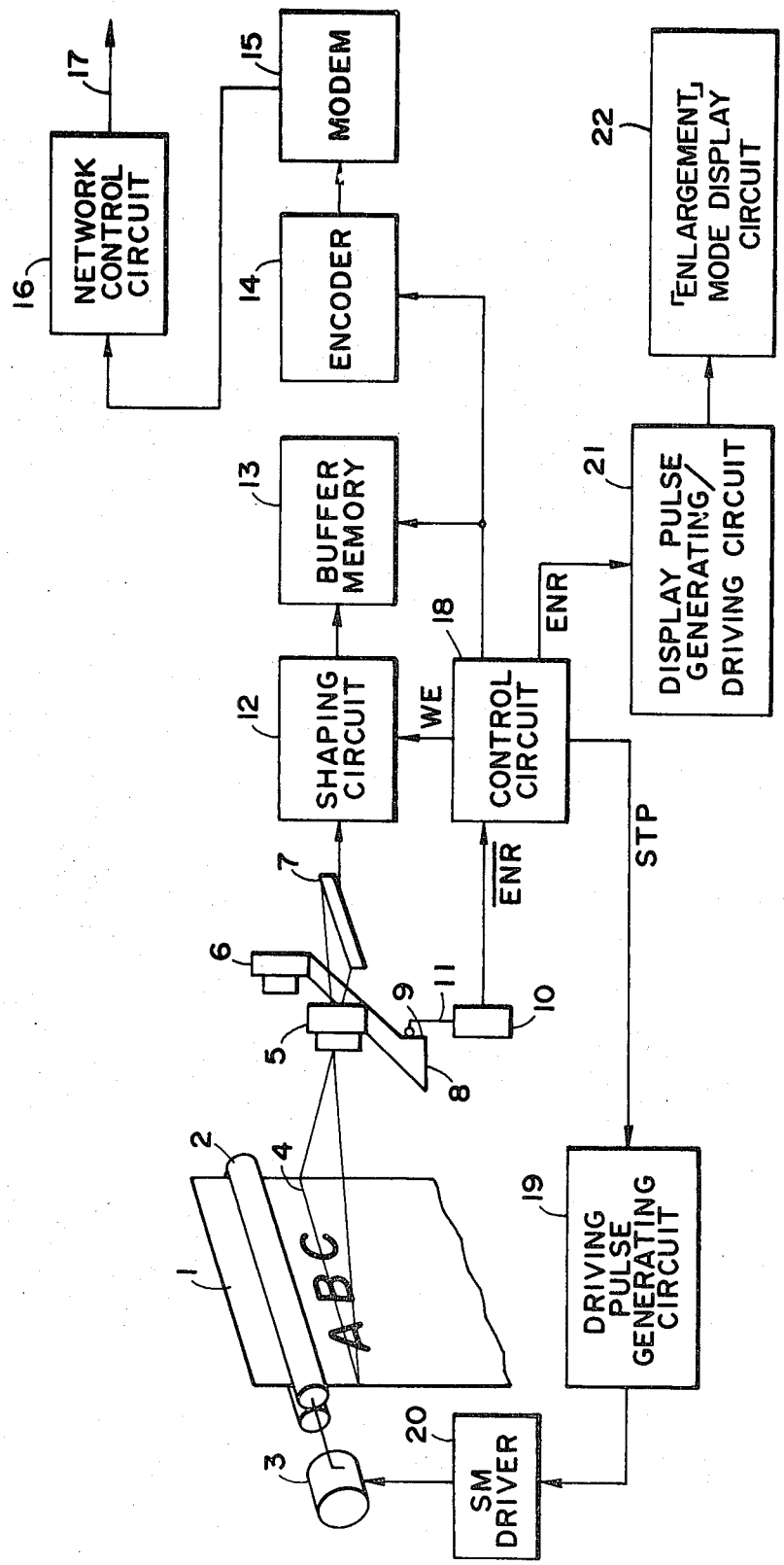
FIG. 1 is a block diagram showing the structure of the facsimile transmitter embodying the present invention.

Referring to FIG. 1 showing the facsimile transmitter of the present invention in a block diagram, an original image 1 is illuminated by an unrepresented illuminating system, and the reflected light is focused onto a charge-coupled device 7 either through a lens 5 for modified size imaging (i.e. enlarging or reducing lens; it is hereinafter assumed to be an enlarging lens for the purpose of simplicity) or through a lens 6 for equal size imaging. The image thus projected optically on the charge-coupled device 7 is sequentially read along a principal scanning direction 4 by means of unrepresented readout clock pulses. The image output signals supplied from the charge-coupled device 7 are digitized in a shaping circuit 12 in the same manner as in the conventional facsimile transmitter and are stored in a buffer memory 13. Said digitizing and storage are effected under the control of a control circuit 18, and the signals in said buffer memory 13 are read and supplied to an encoder 14 when required under the control of said control circuit 18. Said encoder 14 performs run length compression for example according to the modified Haffman coding method. The compressed image signals are then supplied through a modem 15 and a network control circuit 16 and transmitted through a transmission line 17.

Upon completion of the signal reading along a principal scanning line, the control circuit 18 instructs a driving pulse generating circuit 19 to generate a pulse signal for advancing the original image by a scanning pitch in the auxiliary scanning direction, i.e. from below to above in FIG. 1. Said pulse signal drives, after amplification in a driver 20, a stepping motor 3 by an angle required or advancing the original image by a scanning pitch through a roller 2.

Said modified-size imaging lens 5 and equal-size imaging lens 6 are linked with a lever 8 in such a manner that said lenses can be displaced by manual shifting of said lever 8. For example when the lever 8 is pulled toward the front in FIG. 1, the equal-size imaging lens 6 is inserted in the optical path to project the equal-size image of the original 1 onto the charge-coupled device 7. An arm 11 of a microswitch 10 is spaced from a projection 9 of the lever 8 to maintain said microswitch in the open state, whereby the control circuit 18 identifies the signal transmission as being in the equal size mode. In said mode the control circuit 18 turns off the signal to a display pulse generating/driving circuit 21 which is connected to an enlargement mode display circuit 22, whereby said circuit is not activated to indicate the signal transmission in the normal equal-size mode. Naturally there may be provided a display "equal size" for indicating said mode. In said equal-size transmission mode, the control circuit 18 instructs the driving pulse generating circuit to generate four pulses to advance the stepping motor 3 by four steps upon completion of the scanning of each line.

When said lever 8 is pushed backwards to position the modified-size imaging lens 5 in the optical path, an enlarged image is projected onto the charge-coupled device 7 to expand the image in the principal scanning direction. In this state the projection 9 of the lever 8 engages with the lever 11 to turn on the microswitch 10, whereby the control circuit 18 identifies the enlarged size mode. Accordingly the control circuit 18 supplies pulses to the driving pulse generating circuit 19 to drive the stepping motor 3, regulating the displacement of the original in the auxiliary scanning direction in response to the modification of the image size. Said displacement in the auxiliary scanning direction is selected inversely proportional to the modification of the image size. For example, said displacement is reduced to ¾ for an image magnification of 4/3.

The functions of the above-explained facsimile transmitter will be further clarified in the following.

Figure 2:
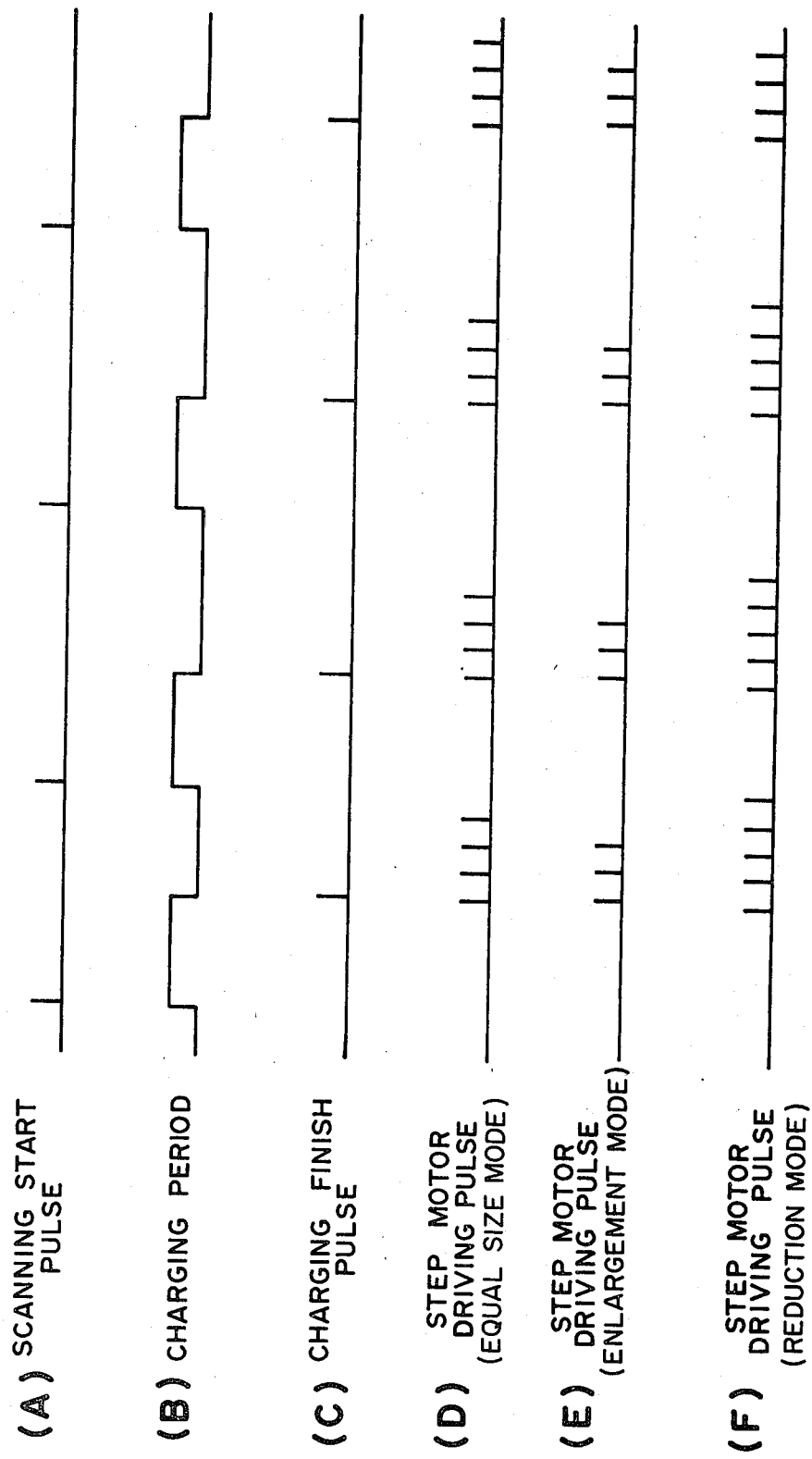
FIG. 2 is a waveform chart showing pulse signals in the apparatus shown in FIG. 1.
Figure 3:
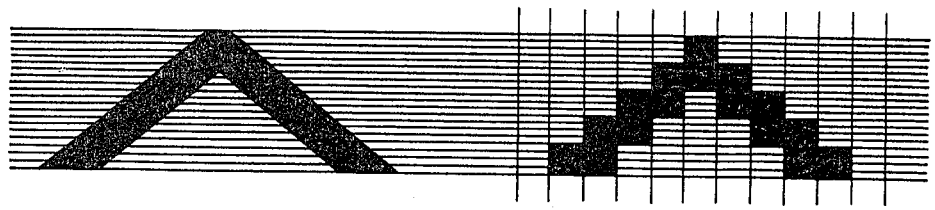
FIGS. 3-(a) and 3-(b) are explanatory views showing the original image scanning in the equal size transmission mode.

Referring to FIG. 2, the charge-coupled device 7, in response to scanning start pulse shown by (A), accumulates the electric charge corresponding to the image intensity during the High-level period of the signal shown by (B). Said charge accumulation is terminated by a pulse shown by (C), supplied from the control circuit 18 to the driving pulse generating circuit 19. In the equal-size transmission mode, the driving pulse generating circuit 19 releases uniformly spaced four pulses in response to the instruction by the control circuit 18, whereby the stepping motor advances the original image by ¼ scanning pitch for each pulse. Consequently the original image is advanced by a scanning pitch in response to said four pulses. FIG. 3 shows the state of scanning in such equal-size transmission mode, wherein the original image (a) is advanced by a scanning pitch as shown by (b) by 4-step advancement of the stepping motor, while said image is projected with the equal size in the principal scanning direction.

Figure 4:
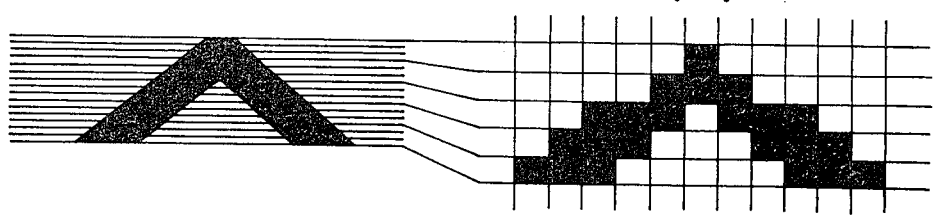
FIGS. 4-(a) and 4-(b) are explanatory views showing the original image scanning in the enlarged size transmission mode.

The lever 8 shown in FIG. 1 is pushed forward in order to transmit an original of approximately A5 size after enlargement into the A4 size, wherein the modified-size imaging lens 5 is inserted into the optical path to project an enlarged image onto the charge-coupled device 7. Simultaneously with the charging end pulse (FIG. 2C), the control circuit 18 causes the driving pulse generating circuit 19 to generate three pulses as shown by (E) in FIG. 2. Consequently in the modified size mode, i.e. in the enlarged imaging mode in the present embodiment, the original is only advanced by ¾ of a scanning pitch in the auxiliary scanning direction, so that the image is expanded in said direction at a rate the same as in the principal scanning direction. FIG. 4 shows the state of scanning in such enlarged transmission mode, wherein the original image (a) is enlarged by 4/3 in the auxiliary scanning direction as shown by (b), due to the three-step advancement of the stepping motor. In this state the modified-size imaging lens 5 expands the image by a factor of 4/3 also in the principal scanning direction, thus achieving a same factor of enlargement in both directions.

Figure 5:
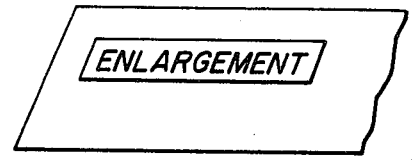
FIG. 5 is a schematic view of a display indicating an enlarged size transmission mode.
Figure 6:
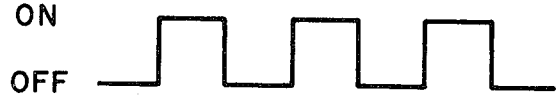
FIG. 6 is a waveform chart showing pulse signals for causing intermittently lighted display.

During said enlarged transmission mode, the control circuit 18 causes the display pulse generating/driving circuit 21 to activate enlargement mode display circuit 22, thereby lighting a display for enlarged transmission mode on a display panel as shown in FIG. 5 and facilitating the confirmation of the operating mode by the operator. Said display can be driven by intermittent pulses shown in FIG. 6 to further facilitate said confirmation.

As explained in the foregoing, the present invention allows to transmit the information of a detailed original image without error to the receiver by the use of the enlarged transmission mode, and such transmission can be achieved with a transmitter of a simple and inexpensive structure since the ordinary equal-size mode and the enlarged-size mode can be selected by changing the number, in a simple ratio, of the steps of a stepping motor per scanning pitch in the auxiliary scanning direction.

Also during such enlarge image transmission, a display indicating such enlarged mode is provided to facilitate the confirmation of the operating mode by the operator, thus ensuring exact image transmission.

Figure 7:
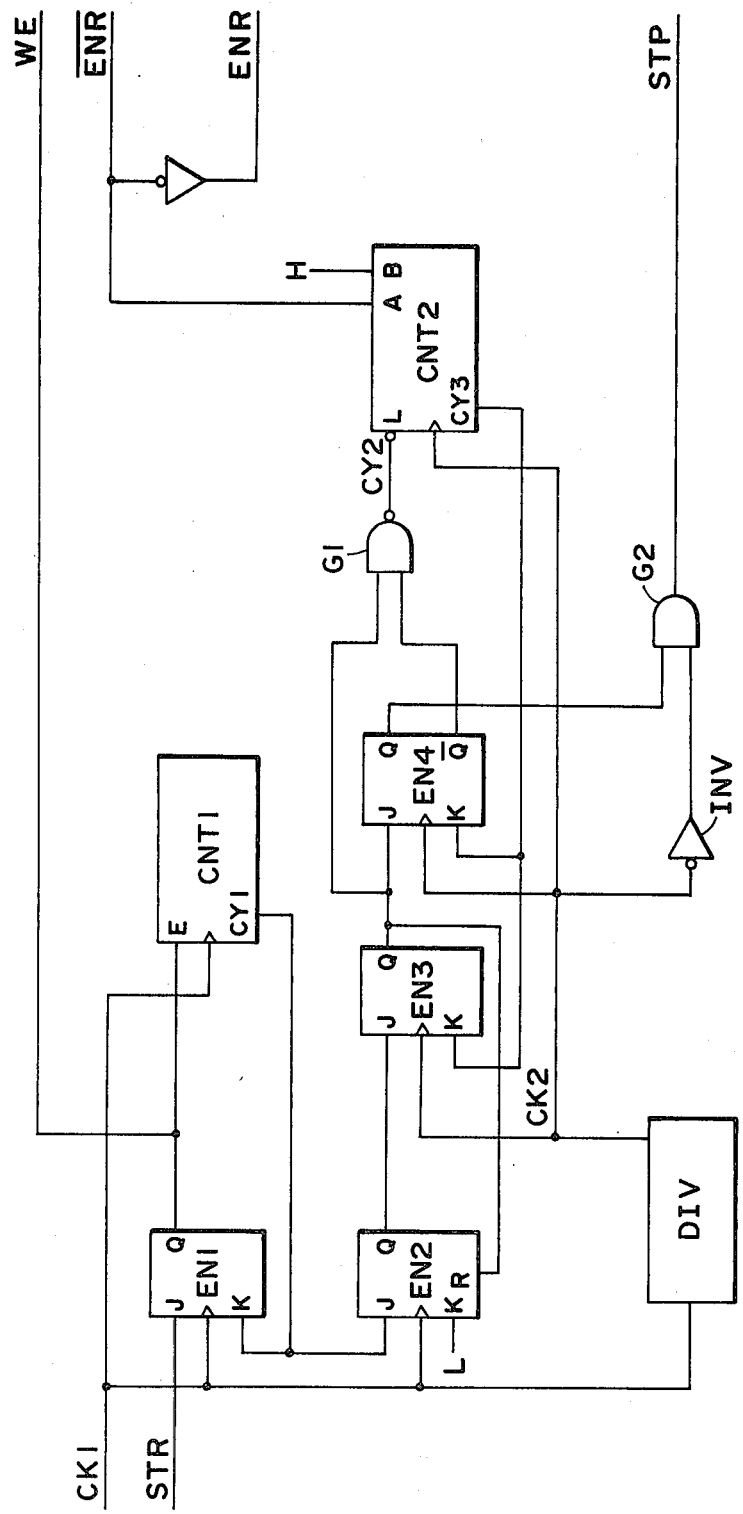
FIG. 7 is a circuit diagram showing the control circuit shown in FIG. 1.
Figure 8:
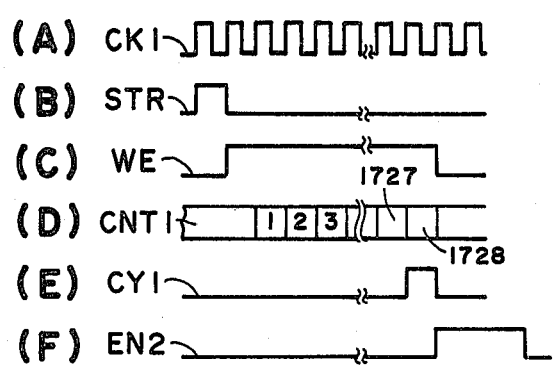
FIGS. 8-(A)-(F), 9-(A)-(G) and 10-(A)-(G) are waveform charts showing the signals in the circuit shown in FIG. 7.
Figure 9:
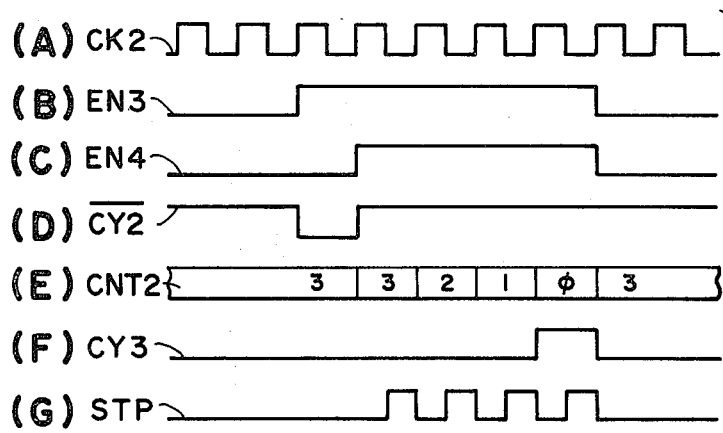
Figure 10:
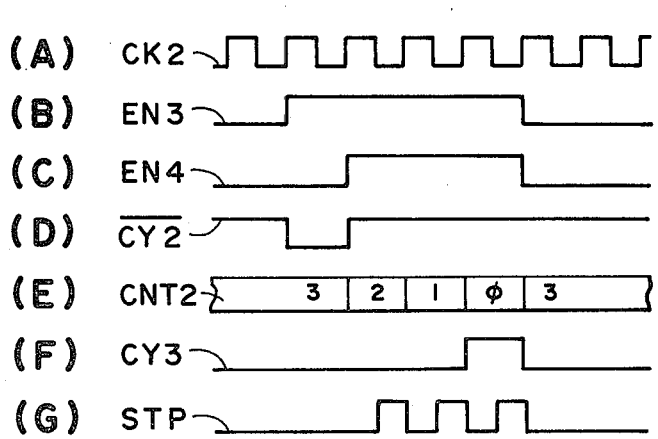

FIG. 7 shows the details of the control circuit 18 shown in FIG. 1, wherein signals WE, ENR, ENR and STP are common in FIGS. 1 and 7. Also FIGS. 8 to 10 show various signals in the circuit shown in FIG. 7.

Referring to FIGS. 7 to 10 and 1, a pulse STR is generated to instruct the reading of succeeding data, when the buffer memory 13 is emptied, and is generated in synchronization with the clock pulse CK1 for signal readout from the charge-coupled device 7. At the same time said pulse STR instructs the start of data readout for a scanning line from said charge-coupled device 7. Consequently the data from said charge-coupled device 7 are stored in the buffer memory 13 during the high-level state of a write enable signal WE caused by the setting of a JK flip-flop EN1 by said pulse STR. The high-level signal WE maintains an enable port E of a 1728-bit counter CNT1 (corresponding to the width of A4 size) to initiate the counting function of said counter CNT1, which emits a carryover signal CY1 during a clock interval upon receipt of the 1727th clock pulse. In response to said signal CY1, the flip-flop EN1 is cleared by the succeeding clock pulse. The data of a scanning line are read from the charge-coupled device 7 in this manner. Upon completion of said signal reading of a scanning line, a JK flip-flop EN2 is set by said signal CY1 in synchronization with the clock pulse CK1.

The clock pulses CK1 are converted by a frequency divider DIV into second clock pulses CK2 of a frequency suitable for driving the stepping motor 3, for example 500 kHz.

Upon setting of the flip-flop EN2, a JK flip-flop EN3 is set in synchronization with the clock pulse CK2, whereby said flip-flop EN2 is cleared.

Also a JK flip-flop EN4 is set with a delay of a clock period from the setting of said flip-flop EN3. The flip-flop EN4 is maintained in the set state only during the supply of the stepping pulse STP to the stepping motor 3. The output Q from the flip-flop EN3 and the inverted output Q from the flip-flop EN4 are supplied through a gate G1 to initialize a counter CNT2 to "3" or "2" as shown in FIG. 9(E) or FIG. 10(E), and the flip-flops EN3 and EN4 are maintained in the set state until the content of said counter CNT2 is reduced to "0" by counting the second clock pulses CK2. Said counter CNT2 is initialized, in response to the low-level state of the carry signal CY2, to "3" or "2" respectively when the signal ENR is at the low- or high-level state, and thereafter reduces the content stepwise in response to each clock pulse CK2. Then, a high-level carry signal CY3 clears the flip-flops EN3 and EN4 to terminate the stepping pulse STP. A gate G2 is controlled by said flip-flop EN4 and transmits the clock pulse CK2 as the stepping pulse STP only during the set state of the flip-flop EN4. The signal ENR is at the low-level or high-level respectively when the transmitted image is enlarged or in the equal-size state.

Although the foregoing description has been limited to the case of enlarging the image, it is also possible to transmit a reduced image by adopting a reducing lens as the modified-size imaging lens 5 shown in FIG. 1. Such reduced image transmission can be achieved for example by generating five pulses as shown in FIG. 2(F) and by replacing the display of "enlarged" shown in FIG. 5 by "reduction".

What I claim is:
1. A facsimile transmitter, comprising:

image-taking means for scanning image information in an original along a principal scanning direction to convert said information into electric signals;

original displacing means for displacing said original in an auxiliary scanning direction substantially perpendicular to said principal scanning direction;

image-forming means for focusing an optical image with one of plural image sizes on said image-taking means in order to obtain image signals for an equal-size image or a modified-size image of the information on said original from said image-taking means;

image size detecting means for detecting information corresponding to the image size of the optical image focused on said image-taking means upon detection of whether said image-forming means is in one position or is in another position; and control means for controlling the amount of displacement of said original by said original displacing means in response to the detection by said size detecting means.

2. A facsimile transmitter according to claim 1, wherein said control means causes said original displacing means to reduce the amount of displacement of said original, when said image-forming means forms an enlarged image, from the amount of displacement for an equal-size image.

3. A facsimile transmitter according to claim 1, wherein said control means causes said original displacing means to regulate the amount of displacement of said original substantially inversely proportional to the image size formed by said image-forming means.

4. A facsimile transmitter, comprising:

image-taking means for scanning image information on an original to convert said information into electric signals;

image-forming means for focusing an optical image with one of plural image sizes on said image-taking means in order to obtain image signals for an equal-size image or a modified-size image of the information on said original from said image-taking means;

image size display means for indicating whether said image-forming means forms an enlarged image or a reduced image;

image size detecting means for detecting information corresponding to the image size of the optical image focused on said image-taking means upon detection of whether said image-forming means is in one position or in another position; and control means for controlling the display by said image size display means in response to the detection by said image size detecting means.

5. A facsimile transmitter according to claim 4, wherein said image size display means is adapted to intermittently display characters representing at least one of said enlarged image size and reduced image size.

6. A facsimile transmitter, comprising:

image-taking means for scanning image information on an original along a principal scanning direction to convert said information into electric signals;

original displacing means for displacing said original in an auxiliary scanning direction substantially perpendicular to said principal scanning direction;

image-forming means for focusing an optical image with one of plural image sizes on said image-taking means in order to obtain image signals for an equal-size image or a modified-size image of the information on said original from said image-taking means;

image size display means for identifying if said image-forming means forms an enlarged image or a reduced image;

image size detecting means for detecting information corresponding to the image size of the optical image focused on said image-taking means upon detection of whether said image-forming means is in one position or in another position; and control means for controlling the amount of displacement of said original and the display by said image size display means, both in response to the detection by said image size detecting means.

7. A facsimile transmitter according to claim 6, wherein said control means causes said original displacing means to reduce the amount of displacement of said original when said image-forming means forms an enlarged image, from the amount of displacement for an equal-size image.

8. A facsimile transmitter according to claim 6, wherein said control means causes said original displacing means to regulate the amount of displacement of said original substantially inversely proportional to the image size formed by said image-forming means.

9. A facsimile transmitter according to claim 6, wherein said image size display means is adapted to intermittently display characters representing at least one of said enlarged image size and reduced image size.

10. A facsimile transmitter, comprising:

image-taking means for scanning image information on an original along a principal scanning direction to convert said information into electric signals;

original displacing means for displacing said original in an auxiliary scanning direction substantially perpendicular to said principal scanning direction;

plural lenses for forming an optical image with one of plural image sizes on said image-taking means in order to obtain image signals for an equal-size image or a modified-size image of the information on said original from said image-taking means;

lens position detecting means for detecting the position of said lenses; and control means for controlling the amount of displacement of said original in response to the detection by said lens position detecting means.

11. A facsimile transmitter according to claim 10, wherein said lens position detecting means is composed of a projecting member to be displaced together with said lenses and a switch to engage with said projecting member for detecting the position of said lenses.

12. A facsimile transmitter according to claim 10 or 11, wherein said control means causes said original displacing means to reduce the amount of displacement of said original, when one of said lenses forms an enlarged image, from the amount of displacement for an equal-size image.

13. A facsimile transmitter according to claim 10 or 11, wherein said control means causes said original displacing means to regulate the amount of displacement of said original substantially inversely proportional to the image size formed by said lens.

14. A facsimile transmitter, comprising:

image-taking means for scanning image information on an original to convert said information into electric signals;

plural lenses for forming an optical image with one of plural image sizes on said image-taking means in order to obtain image signals for an equal-size image or a modified-size image of the information on said original from said image-taking means;

image size display means for displaying if said lenses provide an enlarged image or a reduced image;

lens position detecting means for detecting the position of said lenses; and control means for controlling the display by said image size display means in response to the detection by said lens position detecting means.

15. A facsimile transmitter according to claim 14, wherein said lens position detecting means is composed of a projecting member displaced together with said plural lenses and a switch to engage with said projecting member to detect the position of said lenses.

16. A facsimile transmitter according to claim 14 or 15, wherein said image size display means is adapted to intermittently display characters representing at least one of said enlarged image and reduced image.

17. A facsimile transmitter, comprising:

image-taking means for scanning image information on an original along a principal scanning direction to convert said information into electric signals;

original displacing means for displacing said original in an auxiliary scanning direction substantially perpendicular to said principal scanning direction;

plural lenses for forming an optical image with one of plural image sizes on said image-taking means in order to obtain image signals for an equal-size image or a modified-size image of the information on said original from said image-taking means;

image size display means for displaying if said lenses provide an enlarged image or a reduced image;

lens position detecting means for detecting the position of said lenses; and control means for controlling the amount of displacement of said original by said original displacing means and the display by said image size display means, both in response to the detection by said lens position detecting means.

18. A facsimile transmitter according to claim 17, wherein said lens position detecting means is composed of a projecting member displaced together with said plural lenses and a switch to engage with said projecting member to detect the position of said lenses.

19. A facsimile transmitter according to claim 17 or 18, wherein said control means causes said original displacing means to reduce the amount of displacement of said original, when said lenses provide an enlarged image, from the amount of displacement for an equal-size image.

20. A facsimile transmitter according to claim 17 or 18, wherein said control means causes said original displacing means to regulate the amount of displacement of said original substantially inversely proportional to the image size formed by said lenses.

21. A facsimile transmitter according to claim 17 or 18, wherein said image size display means is adapted to display intermittently characters representing at least one of said enlarged image and reduced image.

* * * * *